(12) United States Patent
Davis et al.

(10) Patent No.: US 10,060,484 B2
(45) Date of Patent: Aug. 28, 2018

(54) TORQUE CONVERTER CLUTCH

(71) Applicant: Barnes Group Inc., Bristol, CT (US)

(72) Inventors: Joaquin Davis, Bristol, CT (US); Mehieddine Rababeh, Bristol, CT (US); Samantha Hajla, Bristol, CT (US)

(73) Assignee: Barnes Group Inc., Bristol, CT (US)

( * ) Notice: Subject to any disclaimer, the term of this patent is extended or adjusted under 35 U.S.C. 154(b) by 0 days.

(21) Appl. No.: 15/286,781

(22) Filed: Oct. 6, 2016

(65) Prior Publication Data

US 2017/0102037 A1    Apr. 13, 2017

Related U.S. Application Data

(60) Provisional application No. 62/238,235, filed on Oct. 7, 2015.

(51) Int. Cl.

| F16D 13/64 | (2006.01) |
|---|---|
| F16F 1/08 | (2006.01) |
| F16F 1/04 | (2006.01) |
| F16F 15/123 | (2006.01) |
| F16H 45/02 | (2006.01) |

(52) U.S. Cl.
CPC ............ *F16D 13/644* (2013.01); *F16F 1/047* (2013.01); *F16F 1/08* (2013.01); *F16F 15/123* (2013.01); *F16D 2300/22* (2013.01); *F16H 2045/0221* (2013.01)

(58) Field of Classification Search
None
See application file for complete search history.

(56) References Cited

U.S. PATENT DOCUMENTS

| 4,810,231 A | * | 3/1989 | Weissenberger | ........ F16F 1/043 |
|---|---|---|---|---|
| | | | | 192/203 |
| 4,810,234 A | | 3/1989 | Weissenberger et al. | |
| 5,882,264 A | * | 3/1999 | Yabe | ....................... F16D 49/02 |
| | | | | 192/203 |
| 7,297,064 B2 | * | 11/2007 | Jackel | ....................... F16F 1/08 |
| | | | | 464/67.1 |

FOREIGN PATENT DOCUMENTS

| DE | 3147717 | * 12/1981 |
|---|---|---|
| EP | 0798489 | 10/1997 |
| EP | 1519065 | 3/2005 |
| JP | 200524056 | 1/2005 |
| JP | 3683924 | 8/2005 |

OTHER PUBLICATIONS

European Search Authority, Extended European Search Report in related EP Application No. 16002159.8 (dated May 19, 2017).

* cited by examiner

*Primary Examiner* — Mark A Manley
(74) *Attorney, Agent, or Firm* — Fay Sharpe LLP

(57) ABSTRACT

An improved torque converter damper disc and/or clutch that includes the use of a parametric spring system. The parametric spring is configured to address critical inflection and pinch points along the spring longitudinal length. These critical points are areas of higher applied stress due to torsional stress and bending stress, the latter of which mainly attributed to centrifugal loading.

23 Claims, 5 Drawing Sheets

US 10,060,484 B2

TORQUE CONVERTER CLUTCH

The present invention claims priority on U.S. Provisional Patent Application Ser. No. 62/238,235, filed Oct. 7, 2015, which is incorporated herein by reference.

The present invention relates to spring systems, particularly to a parametric spring system, and more particularly to a parametric spring system that can be used in a damper disc or clutch plate for torque converters, dual clutch transmissions, manual clutches, and the like.

BACKGROUND ON THE INVENTION

Clutches and dampers for transmission applications are known. In one configuration, a clutch friction surface is disposed radially inward of the damper. Examples of standard clutches and dampers are illustrated in U.S. Pat. Nos. 6,099,435; 6,142,272; and 6,244,401, all of which are hereby incorporated herein by reference.

Current torque converter/clutch (TCC) and damper disc designs include spring pockets that use straight, uniform diameter compression springs and, by design, cause such springs to bend under axial and centrifugal loading, thus subjecting such springs to high applied stress. The straight springs have a constant spring diameter and constant coil spacing along the longitudinal length of the spring. The spring pockets in the TCC/damper disc generally have a "radius" for clearance above the spring so as to minimize contact of the spring and the spring pocket under most loading conditions, thereby limiting or preventing hysteresis, NVH (noise, vibration and harshness), spring material wear and particulate contamination, etc. The spring pockets also typically utilize a larger radius at the top of the damper pocket to achieve a larger effective radius and higher torque capacity gains during the operation of the TCC/damper disc. However, the high applied stresses on the spring during the operation of the TCC often cause premature failure of the spring which thus requires using advanced spring materials and significant and costly processing to improve fatigue life.

In view of the prior art, there is a need for an improved TCC, clutch and damper discs having improved life, and an improved spring system that can be used in a TCC, clutch and damper discs, which spring has improved spring fatigue life.

SUMMARY OF THE INVENTION

The present invention relates to spring systems, particularly to a parametric spring system, and more particularly to a parametric spring system that can be used as a torsion damper means in a damper disc or clutch plate for torque converters (TC), dual clutch transmissions (DCT) and manual clutches. Although the use of the parametric spring system will be particularly described with regard to use in a TC/damper disc application, it will be appreciated that the parametric spring system can be used in other applications where the spring is subjected to both axial and centrifugal loading.

In one non-limiting aspect of the present invention, there is provided a parametric spring suitable for use in TCC/damper applications. The parametric spring can be coiled and configured to be axially and centrifugally compressible; however, this is not required. Furthermore, the general spring characteristics of the parametric spring can be customized for a particular application by adjusting the longitudinal length of the spring, adjusting the diameter of the wire used to form the spring, adjusting the outer diameter of the spring along the longitudinal length of the spring, adjusting the diameter profile of the spring along the longitudinal length of the spring, adjusting the coil spacing of the spring along the longitudinal length of the spring, selecting the number of coils in the spring along the longitudinal length of the spring, selecting the material used to form the spring, etc.

In another and/or alternative non-limiting aspect of the present invention, the longitudinal length of the parametric spring is non-limiting. In one non-limiting embodiment, when relaxed (i.e. not bearing an axial and/or centrifugal load), the longitudinal length of the parametric spring is typically from about 0.25 inches to about 20 inches (and all ranges or values therebetween), more typically from about 0.5 inches to about 18 inches, and more typically from about 1 inch to about 16 inches; however, this is not required. In another and/or alternative non-limiting embodiment, when compressed (i.e. bearing an axial and/or centrifugal load), the longitudinal length of the parametric spring is typically from about 0.25 inches to about 12 inches (and all ranges or values therebetween), more typically from about 0.5 inches to about 10 inches, and more particularly from about 1 inch to about 6 inches; however, this is not required. In another and/or alternative non-limiting aspect of the present invention, the parametric spring generally follows a linear axis along the longitudinal length of the parametric spring; however, this is not required. As can be appreciated, the parametric spring can be configured to follow a non-linear axis along the longitudinal length of the parametric spring, such as, for example, an axis of arcuate shape; however, this is not required. In another and/or alternative non-limiting aspect of the present invention, when the parametric spring follows a linear axis, any of the general spring characteristics (as previously described) can be variable or constant along the longitudinal length of the parametric spring.

In another and/or alternative non-limiting aspect of the present invention, the cross-sectional shape of the wire used to form the parametric spring is non-limiting. In one non-limiting embodiment, the cross-sectional shape of the wire is circular; however, other or alternative shapes can be used (e.g., square, rectangular, triangular, polygonal, oval, etc.). Generally, the cross-sectional shape of the wire used to form the parametric spring is constant along the longitudinal length of the parametric spring; however, this is not required. As can be appreciated, the cross-sectional shape of the parametric spring can be variable along the longitudinal length of the parametric spring. For example, in one non-limiting embodiment, the cross-sectional shape of the wire at a first end of the parametric spring can be generally trapezoidal, and can progressively shift to a circular cross-sectional shape at or near a midpoint of the parametric spring. Similarly, the cross-sectional shape of the wire at a second end of the parametric spring can be generally trapezoidal, and can progressively shift to a circular cross-sectional shape at or near a midpoint of the parametric spring; however, this is not required. The trapezoidal cross-sectional shape (when used) of the parametric spring at the first and/or second ends of the parametric spring can provide a connection arrangement and/or mounting surface which can allow the parametric spring to be connected and/or mounted to a device such as, for example, a component of a clutch plate assembly.

In another and/or alternative non-limiting aspect of the present invention, the diameter of the wire used to form the parametric spring (when a circular cross-sectional wire shape is used) is non-limiting. The diameter of the wire used to form the parametric spring can be constant or be variable along the longitudinal length of the parametric spring. In one non-limiting embodiment of the present invention, the diameter of the wire used to form the parametric spring is constant along the longitudinal length of the spring. In another non-limiting embodiment of the present invention, the diameter of the wire used to form the parametric spring increases from a first end of the parametric spring to a midpoint of the parametric spring, and then decreases from the midpoint of the parametric spring to a second end of the parametric spring; however, this is not required. In such an embodiment, the increasing wire diameter consequently causes the spring rate to increase from the first end of the spring to the midpoint of the spring. Similarly, the decreasing wire diameter consequently causes the spring rate to decrease from the midpoint of the spring to the second end of the spring. However, as can be appreciated, when other or additional general spring characteristics (e.g., the outer diameter of the coils, etc.) are adjusted, the general spring characteristics can be specifically adjusted so as to maintain a constant spring rate along the longitudinal length of the parametric spring; however, this is not required. In one non-limiting embodiment, the diameter of the wire at or near an end of the parametric spring is typically from about 0.01 inches to about 2 inches (and all values and ranges therebetween), more typically from about 0.02 inches to about 1.5 inches, and more typically from about 0.025 inches to about 1.25 inches; however, this is not required. In another and/or alternative non-limiting embodiment, the diameter of the wire at or near the midpoint of the parametric spring is typically from about 0.01 inches to about 4 inches (and all values and ranges therebetween), more typically from about 0.02 inches to about 2 inches, and more typically from about 0.025 inches to about 1.5 inches; however, this is not required. In another and/or alternative non-limiting embodiment, the ratio of spring midpoint wire diameter to spring end wire diameter is typically about 10:1, more typically about 6:1, and still more typically about 3:1.

In another and/or alternative non-limiting aspect of the present invention, the wire used to form the spring is typically formed into a coiled and/or helical shape about an imaginary center axis; however, this is not required.

In another and/or alternative non-limiting aspect of the present invention, the outer diameter of the parametric spring (i.e., the coil outer diameter) is non-limiting. The outer diameter of the parametric spring is generally different along the longitudinal length of the parametric spring. Generally, the coil outer diameter is configured to be greater than the thickness of the clutch plate assembly when used in such applications; however, this is not required. In another and/or alternative non-limiting embodiment of the present invention, the outer diameter of the parametric spring can increase from a first end of the parametric spring to a midpoint of the parametric spring, and then decreased from the midpoint of the parametric spring to a second end of the parametric spring; however, this is not required. As such, the outer diameter of the parametric spring at or near the midpoint of the parametric spring is greater than the outer diameter of the parametric spring at or near the first and/or second ends of the parametric spring; however this is not required. In such an embodiment, the increasing outer diameter consequently causes the spring rate to decrease from the first end of the spring to the midpoint of the spring, and the decreasing outer diameter of the spring consequently causes the spring rate to increase from the midpoint of the spring to the second end of the spring; however, this is not required. In one non-limiting embodiment, the outer diameter of the spring is typically from about 1 inch to about 12 inches at or near an end of the spring (and all values and ranges therebetween), and typically from about 1 inch to about 20 inches at or near a midpoint of the spring (and all values and ranges therebetween); however, this is not required.

In another and/or alternative non-limiting aspect of the present invention, the coil spacing of the parametric spring (i.e., the distance between adjacent coils) is non-limiting. The coil spacing of the parametric spring can be the same or different along the longitudinal length of the parametric spring. In one non-limiting embodiment, the coil spacing is constant along the longitudinal length of the parametric spring; however, this is not required. In another non-limiting embodiment, the coil spacing is variable and/or non-constant along the longitudinal length of the parametric spring; however, this is not required. In another and/or alternative non-limiting embodiment of the present invention, the coil spacing of the parametric spring can increase from a first end of the parametric spring to a midpoint of the parametric spring, and then decrease from the midpoint of the parametric spring to a second end of the parametric spring; however, this is not required. As such, the coil spacing at or near the midpoint of the parametric spring is greater than the coil spacing at or near the first and/or second ends of the parametric spring; however, this is not required. In such an embodiment, the increasing coil diameter consequently causes the spring rate to increase from the first end of the parametric spring to the midpoint of the parametric spring. Similarly, the decreasing coil diameter consequently causes the spring rate to decrease from the midpoint of the parametric spring to the second end of the spring. In one non-limiting embodiment, the coil spacing of the parametric spring is typically from about 0.001 inches to about 3 inches at or near an end of the spring (and all values and ranges therebetween), and typically from about 0.005 inches to about 6 inches at or near a midpoint of the spring (and all values and ranges therebetween); however, this is not required.

In another and/or alternative non-limiting aspect of the present invention, the number of coils in the parametric spring is non-limiting. In one non-limiting embodiment of the present invention, the total number of coils in the parametric spring is typically from about 2 coils to about 200 coils (and all values and ranges therebetween), more typically from about 4 coils to about 100 coils, and still more typically from about 6 coils to about 80 coils; however, this is not required.

In another and/or alternative non-limiting aspect of the present invention, the material used to form the parametric spring is non-limiting. In one non-limiting aspect of the present invention, the material used to form the parametric spring is a flexible material, such as, for example, a light-gauge metal material; however, other and/or additional materials can be used (e.g., plastic material, composite material, resinous material, or combinations thereof, etc.). The type of material used to form the parametric spring can be chosen based on a variety of factors including, but not limited to, temperature tensile strength, fatigue life, corrosion resistance, weight of the material, cost of the material, durability of the material, desired compressibility, elastic modulus, etc. In another and/or alternative non-limiting aspect of the present invention, the material used to form the parametric spring can be coated and/or treated such as, for example, by being galvanized to increase rigidity and strength, heat treated, and/or coated with a plastic material, composite material, etc. for the purpose of improving one or more general spring characteristics. Generally, the parametric spring is formed in a one-piece construction comprising one wire formed from one material; however, this is not required. As can be appreciated, when two or more wires are used, the material of the two or more wires can be the same or different.

In another and/or alternative non-limiting aspect of the present invention, the spring rate is constant or variable and/or non-constant along the longitudinal length of the parametric spring, thereby allowing the parametric spring to compress at a constant rate or at a variable rate along the longitudinal length of the spring when a load is applied.

In one non-limiting aspect of the present invention, there is provided a parametric spring which can be used in a clutch plate assembly as part of a vehicular clutch system such as, for example, a clutch system which couples an engine to a transmission, thereby allowing a transfer of power created by the engine to the transmission and, ultimately, causing the vehicle to move. In such clutch systems, an output shaft extends outwardly from the engine, and terminates at an integrally formed flywheel, the flywheel typically providing an engagement surface. In operation, the engine causes the output shaft, and therefore the flywheel, to rotate about an axis of rotation, the axis of rotation being generally concentric with the output shaft and the flywheel. The clutch plate assembly typically provides an engagement surface, and is typically connected to an input shaft of the transmission. In operation, when the clutch is engaged (e.g., when the engagement surface of the clutch plate assembly is in contact with the engagement surface of the flywheel), the clutch plate assembly is caused to rotate thereby causing the input shaft to rotate and, ultimately, causing the vehicle to move. The clutch assembly typically includes a clutch plate, a retaining plate, a hub assembly and one or more springs.

The size, shape and material of the clutch plate are non-limiting. The clutch plate has a front and rear surface. At least a portion of the front and/or rear surfaces of the clutch plate can include a friction material (e.g., metal material, composite material, resinous material, etc.) designed to increase frictional engagement between the clutch plate and flywheel when the clutch plate assembly is engaged; however, this is not required. As can be appreciated, the clutch plate can be formed from materials having frictional characteristics, thereby alleviating the need for additional friction materials; however, this is not required. The clutch plate is typically circular in shape; however, other or alternative shapes can be used (e.g., square, oval, rectangular, polygonal, etc.). In another and/or alternative non-limiting embodiment, the diameter of the clutch plate is typically from about 4 inches to about 20 inches (and all values and ranges therebetween), more typically from about 6 inches to about 18 inches, and more typically from about 8 inches to about 16 inches; however, this is not required. The clutch plate can include a center hole and/or aperture configured to facilitate insertion of a hub assembly, an engine output shaft and/or an input shaft therethrough; however, this is not required. Similarly, the clutch plate can include one or more holes and/or apertures provided on the surface thereof, the one or more holes and/or apertures designed to facilitate insertion of one or more fasteners therethrough; however, this is not required. The one or more holes and/or apertures can be threaded so as to facilitate insertion of one or more reciprocally threaded fasteners; however, this is not required.

The clutch plate can include a plurality of spring openings provided circumferentially about the clutch plate for the purpose of at least partially receiving at least one parametric spring therein. The number of spring openings provided in the clutch plate is non-limiting. In one non-limiting embodiment, the number of spring openings is typically from about 1 to about 12, more typically from about 2 to about 10, and in one specific non-limiting embodiment, the number of spring openings is 4-8; however, this is not required. Additionally, the clutch plate can include one or more rows of spring openings. When one row of spring openings is used, the spring openings can be provided circumferentially around the clutch plate at or near a position about ½ the radius of the clutch plate; however, this is not required. Similarly, when two rows of spring openings are used, the first and second rows of spring openings can be provided at about ⅓ and about ⅔, respectively, the radius of the clutch plate; however, this is not required. The clutch plate can be configured to inhibit or prevent one or more of the parametric springs from fully passing through the backside of the clutch plate. Also or alternatively, a back plate can be connected to the backside of the clutch plate to inhibit or prevent one or more of the parametric springs from fully passing through the backside of the clutch plate.

The size and shape of the retaining plate are non-limiting. The retaining plate is typically configured to be connected to the front surface of the clutch plate; however, this is not required. Generally, the retaining plate includes a front and rear surface. In one non-limiting embodiment, when the retaining plate is connected to the front surface of the clutch plate, there is provided a space and/or gap therebetween. The retaining plate can be substantially circular in shape; however, other or alternative shapes can be used (e.g., square, oval, rectangular, polygonal, etc.). The retaining plate can include a center hole and/or aperture configured to facilitate insertion of a hub assembly and/or input shaft therethrough; however, this is not required. The retaining plate can include one or more holes and/or apertures configured to facilitate movement of one or more fasteners therethrough; however, this is not required. In one non-limiting embodiment, the one or more holes and/or apertures of the retaining plate are configured to correspond with the one or more holes and/or apertures of the clutch plate, thereby providing at least one hole and/or aperture capable of facilitating insertion of a fastener therethrough for the purpose of connecting the retaining plate to the clutch plate; however, this is not required. In one non-limiting embodiment, the diameter of the retaining plate is typically from about 4 inches to about 20 inches (and all values and ranges therebetween), more typically from about 6 inches to about 18 inches, and more typically from about 8 inches to about 16 inches; however, this is not required. The diameter of the retaining plate can be about equal to or less than the diameter of the clutch plate; however, this is not required.

The retaining plate can include a plurality of spring openings provided circumferentially thereabout for the purpose of at least partially releasably securing at least one parametric spring therein. The plurality of spring openings are generally configured to at least partially align with the plurality of spring openings on the clutch plate. The size and shape of the spring openings of the retaining plate can be the same as or different from the spring openings of the clutch plate. In one non-limiting embodiment of the present invention, the size and shape of the spring openings of the retaining plate can be the same or smaller than the spring openings of the clutch plate; however, this is not required. Optionally, a surface of the retaining plate can include one or more arrangements (e.g., flanges, hooks, etc.) configured to extend outwardly and at least partially over the spring openings of the retaining plate for the purpose of inhibiting or preventing the at least one parametric spring from being displaced from the spring opening in the retaining plate and/or clutch plate; however, this is not required.

In another and/or alternative non-limiting aspect of the present invention, the size, shape and material of the hub assembly are non-limiting. Generally, the hub assembly includes a cylindrical hub element having a hub flange extending radially outwardly therefrom. Typically, the hub flange extends radially outwardly and substantially perpendicularly (e.g., approximately) 85°-95° from an end of the hub element, thereby providing a substantially planar front and rear surface; however, this is not required. In one non-limiting configuration, the hub flange is integrally formed with the hub element; however, this is not required. As can be appreciated, the hub flange and hub element can be formed as separate components. In another and/or alternative non-limiting aspect of the present invention, the interior of the hub element is splined so as to be caused to be rotated by rotation of an input shaft; however, this is not required.

The hub flange includes a plurality of spring openings provided circumferentially thereabout for the purpose of at least partially containing at least one parametric spring therein. The plurality of spring openings can be configured to at least partially align with 1) the spring openings of the clutch plate, and/or 2) the spring openings of the retaining plate; however, this is not required. In one non-limiting embodiment, the size and shape of the spring openings of the hub flange are the same as 1) the spring openings of the clutch plate, and/or 2) the spring openings of the retaining plate; however, this is not required. As such, during assembly of the clutch plate assembly, the hub element can be inserted through the center hole and/or aperture of the retaining plate such that the rear surface of the retaining plate is positioned at or near the front surface of the hub flange. Generally, in such a configuration, the hub assembly is positioned between the retaining plate and the clutch plate and generally movable relative to the retaining plate and the clutch plate; however, this is not required.

In another and/or alternative non-limiting aspect of the present invention, at least 1) the spring openings of the clutch plate, 2) the spring openings of the hub assembly, and/or 3) the spring openings of the retaining plate define a plurality of damper pockets configured to hold one or more parametric spring. In one non-limiting embodiment, each damper pocket contains a single parametric spring.

The size and shape of each of the damper pockets are non-limiting. The plurality of damper pockets is generally configured to confine and/or limit the movements of the at least one parametric spring therein. As such, the plurality of damper pockets are configured to limit the compression and/or relaxation of the parametric spring to the shape of the damper pocket, thereby inhibiting or preventing the parametric spring from being released from the damper pocket, deformed, and/or damaged during use.

The width of the damper pocket is generally variable; however, this is not required. When a variable-width damper pocket is used, the damper pocket typically includes a middle portion with a greater width than a first and/or second end portion; however, this is not required. As such, in one non-limiting configuration, the width of the damper pocket increases from a first end to a middle portion, and decreases from a middle portion to a second end thereof; however, this is not required. Generally, the width of the damper pocket is configured to be greater than the width of the parametric spring along the longitudinal length of the parametric spring; however, this is not required. In another and/or alternative non-limiting embodiment, the width of the damper pocket is constant along the longitudinal length of the damper pocket; however, this is not required. Thus, when a parametric spring is used, the parametric spring is not in constant engagement with the spring pocket along the entire longitudinal length of the parametric spring, thereby decreasing over all spring wear and increasing the fatigue life of the parametric spring. In such an embodiment, when a parametric spring system is used, a majority of the spring is in near-constant engagement with the spring pocket along the longitudinal length of the spring, thereby minimizing excessive movement of the parametric spring within the spring pocket; however, this is not required. In another and/or alternative non-limiting aspect of the present invention, the damper pocket is substantially arcuate in shape relative to the axis of rotation (i.e., the center of the clutch plate, retaining plate and/or hub assembly); however, this is not required. One non-limiting advantage to using a damper pocket of arcuate shape is that movement of the parametric spring within the damper pocket occurs in the same relative path that the damper pocket moves about the axis of rotation, thereby decreasing wear on the parametric spring.

It is has been determined that, dependent on the application, the shape of the damper pocket can have a significant impact on both pocket wear and spring wear. For example, constant engagement between the spring and the damper pocket can result in 1) wear to the spring, thereby decreasing the fatigue life of the spring, and/or 2) wear to the damper pocket, thereby decreasing the life of the clutch plate assembly. Additionally, it has been determined that in current damper disc systems using a straight compression spring and constant diameter spring in a damper pocket that the ends of the compression spring that engage the ends of the damper pocket are under the most stress during compression of the compression spring. The constant contact between the ends of the compression spring and the damper pocket can decrease the fatigue life of the spring. Similarly, the constant contact between the ends of the compression spring and the damper pocket can cause undue damper pocket wear, thereby potentially decreasing the effectiveness of the dampening effects of the damper disc system. Furthermore, springs in clutch plate applications are typically subjected to axial and/or centrifugal loading forces. Current straight, uniform diameter compression springs (when used in such applications) are prone to breakage and/or wear at or near the end coils due to such loading conditions. For instance, when an axial load is applied to straight, uniform diameter compression springs, the stress applies to the compression spring is much less than when an axial load and a centrifugal load are applied to the compression spring. As such, designs mechanisms in the clutch components are required to address this induced bending and more advanced materials and/or processing is required to provide the desired fatigue life of the compression spring.

To alleviate the downfalls and disadvantages of a clutch plate assembly incorporating a straight, uniform diameter compressing spring, it is one non-limiting objective of the present invention to provide a parametric spring which, when subjected to axial and/or centrifugal loading in clutch plate applications, minimizes pocket wear and/or spring wear. For example, when an axial load and a centrifugal load are applied to the parametric spring of the present invention, the shear stress and the principal stress applied to the parametric spring were found to unexpectedly be less than when applied to a straight, uniform diameter compressing spring with the same longitudinal length, number of coils, material, wire diameter and wire cross-sectional shape as the parametric spring. The novel use of the parametric spring of the present invention (when used in clutch plate applications) dissipates the stresses approximately equally across the longitudinal length of the parametric spring. As such, the effect of high applied stress due to bending is substantially lowered, and the fatigue life of the parametric spring is increased.

In operation, when the clutch plate assembly of the present invention is incorporated into a clutch system, the hub assembly is constantly engaged with an input shaft of a transmission. The clutch plate and retaining plate on the other hand are caused to rotate with rotation of an output shaft of an engine. As previously described, the output shaft of the engine typically includes a flywheel connected thereto. As such, when a pressure plate of the clutch system is caused to apply pressure to the clutch plate, the frictional surface of the clutch plate is caused to move into contact with the flywheel, thereby engaging the clutch. Initially, in a resting position (i.e., when the clutch plate assembly is not engaged), a first end of the parametric spring is seated at least partially on 1) a first end of a spring opening in the clutch plate, 2) a first end of a spring opening in the retaining plate, and/or 3) a first end of a spring opening in the hub flange. Similarly, a second end of the parametric spring is seated at least partially on 1) a second end of a spring opening in the clutch plate, 2) a second end of a spring opening in the retaining plate, and/or 3) a second end of a spring opening in the hub flange. Thus, when the clutch plate assembly is engaged (i.e., caused to move into contact with the flywheel), the clutch plate and retaining plate are caused to rotate in the direction of the flywheel. The torque vibrations transmitted by engagement of the clutch plate assembly are absorbed by relative movements between the hub flange, the clutch plate and the retaining plate. More particularly, the torque vibrations are absorbed via the parametric springs provided in the spring pockets of the clutch plate assembly. When the hub flange rotates in the gap and/or space between the clutch plate and the retaining plate such as, for example, in a clockwise direction, by a predetermined angle "$\alpha$", each of the parametric springs is caused to compress. In one non-limiting configuration, the parametric springs are configured to compress gradually such that a first end of the parametric spring is at least partially seated on an end of the spring opening in the hub flange while a second end of the parametric spring is at least partially seated on 1) an end of the spring opening in the clutch plate, and/or 2) an end of the spring opening in the retaining plate. As such, when the clutch plate assembly is being driven by engagement with a flywheel and torque is being transmitted to the clutch plate assembly, the parametric springs are caused to move in a clockwise direction with the clutch plate assembly within the damper pockets. Thus, the applied torque is transmitted through axial and centrifugal compression (i.e. loading) of the parametric spring.

In accordance with another and/or alternative non-limiting aspect of the present invention, the length of the spring opening in the hub flange, the spring opening in the clutch plate and/or the spring opening in the retaining plate is approximately equal to or less than the longitudinal length of the parametric spring; however, this is not required. As such, when torque is applied to the clutch plate assembly, the maximum angle of displacement between the hub assembly and the clutch plate and retaining plate is limited by the longitudinal length of the parametric spring when compressed. Similarly, the minimum angle of displacement between the hub assembly and the clutch plate and retaining plate is limited by the longitudinal length of the parametric spring when fully relaxed or substantially relaxed. In existing clutch plate systems utilizing straight compression springs, the torque is absorbed by the straight compression springs at a constant rate, the constant rate approximately the same as the compressibility (i.e., spring rate) of the straight compression spring. In such systems, when the maximum angle of displacement is aggressively approached, the straight compression spring can be bent, malformed and/or broken, thereby also causing extensive wear and/or damage to the damper pocket. In contrast, when a parametric spring is used in a clutch plate assembly, it was unexpectedly found that the torque is progressively absorbed by the parametric spring at a variable rate, such as, for example, a continuously increasing rate. Thus, when the maximum angle of displacement is approached, the outer diameter and/or coil-space transition at or near the middle coils of the presently described parametric spring can control the amount of bending allowable in the parametric spring, thereby minimizing both spring and pocket wear, and extending the fatigue life of the parametric spring. Additionally, the maximum angle of displacement between the hub assembly and the clutch plate and retaining plate can be selectively adjusted by 1) decreasing the size of the spring opening in the clutch plate relative to the size of the spring opening in the hub flange, 2) increasing the size of the spring openings in the hub flange relative to the longitudinal length of the parametric spring, and/or 3) increasing or decreasing the compressibility (i.e., spring rate) of the parametric spring.

In another and/or alternative non-limiting aspect of the present invention, there is provided a clutch plate assembly having more than one spring pocket. The size and shape of the more than one spring pockets can be the same or different so as to facilitate various sized and/or shaped parametric springs; however, this is not required. For example, in a hub flange assembly having a first, second, third and fourth spring pocket, the size of the opening of the first and third spring pockets can be the same, and can be greater than the size of the opening of the second and fourth spring pockets; however, this is not required. In such a configuration, the minimum angle of displacement "$\beta$" required to compress the parametric spring in the first and third spring pockets can be less than the minimum angle of displacement "$\gamma$" required to compress the parametric spring in the second and fourth spring pockets. As such, when the hub flange is caused to rotate further than angle "$\beta$", the first and third parametric springs can be caused to gradually and/or progressively compress. When the hub flange is caused to be further rotated, such as, for example, further than angle "$\gamma$", the second and fourth parametric springs can be caused to gradually and/or progressively compress, along with the continued gradual and/or progressive compression of the first and third parametric springs; however, this is not required. In such a configuration, angle "$\gamma$" can be set such that when the first and third parametric springs reach from about 65% to about 95% maximum compression, the second and fourth parametric springs start to compress; however, this is not required. As can be appreciated, many other configurations can be used.

It is accordingly one non-limiting aspect of the present invention to provide a method that includes the use of a parametric spring that improves the benefits of the pocket design for hysteresis/NVH concerns in a TCC/damper and minimizes bending stress that affects the fatigue life of the parametric spring. Using such a method, a parametric spring can be configured to a unique outer diameter and/or coil-space geometry profile for a particular application. Such spring configuration could be used to control:

Item 1: The contact location near the end coils (initial and heaviest point of contact between the spring and the damper pocket) and/or what coils are "active" and in which regions of the spring under critical loading situations.

Item 2: The amount of clearance and the amount of spring bending of the middle coils under axial and/or centrifugal loading (the highest point of contact between spring and the damper pocket).

The parametric design of the spring can be used to:
Provide an outer diameter profile and/or coil-space transition between the end and adjacent coil(s) that would minimize adverse engagement/contact between the spring and pocket and/or
The outer diameter and coil-space transition to the middle coils could be configured to control the amount of bending allowable of the middle coils to balance a larger, effective pocket radial while minimizing spring stress and hysteresis/NVH and wear concerns.

One non-limiting advantage of using the presently described parametric spring in a TCC is to control the bending under axial and centrifugal loading thereby improving the fatigue life of the parametric spring in the TCC application. Existing straight compression springs that are currently used in TCC application have no (or more limited) designed mechanisms to address this induced bending and usually require more advanced material and processing to provide the needed fatigue life of the straight spring. Spring breakage near the end coils due to the above loading conditions is a common and known failure mode of straight springs. The use of a parametric spring in accordance with the present invention unexpectedly lowers the effects of high applied stress due to bending while still addressing NVH concerns and increases the fatigue life of such spring.

For purposes of this invention, a parametric spring is a spring that has a non-constant spring diameter and/or coil spacing along the longitudinal length of the spring. The parametric spring can be straight or curved along its longitudinal axis. The outer diameter profile, coil thickness, wire size, wire shape and/or material can be the same or different along the longitudinal length of the parametric spring.

It is accordingly one non-limiting objective of the present invention to provide an improved assembly for a TCC and/or clutch damper/discs.

It is another and/or alternative non-limiting objective of the present invention to provide a clutch plate assembly comprising: a clutch plate having at least one spring opening, a retaining plate connected to the clutch plate, the retaining plate having at least one spring opening, a hub assembly provided between the clutch plate and the retaining plate, the hub assembly having at least one spring opening, wherein the at least one spring opening in the clutch plate, the at least one spring opening in the retaining plate, and the at least one spring opening in the hub assembly are at least partially aligned when the clutch plate assembly is fully assembled thereby providing at least one damper pocket; and, at least one parametric spring positioned in the at least one damper pocket.

It is another and/or alternative non-limiting objective of the present invention to provide a parametric spring that has (1) an outer diameter which is variable along a longitudinal length of the parametric spring, and/or (2) a coil-space transition which is variable along a longitudinal length of the parametric spring.

It is another and/or alternative non-limiting objective of the present invention to provide a parametric spring that has a spring rate which is variable along a longitudinal length of the parametric spring.

It is another and/or alternative non-limiting objective of the present invention to provide a parametric spring that is capable of distributing and absorbing an applied torque along a longitudinal length of the parametric spring.

It is another and/or alternative non-limiting objective of the present invention to provide a parametric spring that is capable of distributing and absorbing an applied torque along a longitudinal length of the parametric spring, and which absorption of the applied torque results in an increased fatigue life of the parametric spring during the operation of a clutch plate assembly.

It is another and/or alternative non-limiting objective of the present invention to provide a clutch plate assembly capable of reducing torsional vibrations of a torque converter clutch.

It is another and/or alternative non-limiting objective of the present invention to provide a clutch plate assembly comprising: a clutch plate providing a front and rear surface, the clutch plate further comprising at least one spring opening; a retaining plate configured to be connected to the front surface of the clutch plate, the retaining plate spaced apart from the clutch plate so as to form a gap therebetween, the retaining plate further comprising at least one spring opening; a hub assembly, the hub assembly further comprising a hub element and a hub flange, the hub flange being positionable in the gap between the retaining plate and the clutch plate, the hub flange further comprising at least one spring opening, wherein the at least one spring opening of the clutch plate, the at least one spring opening of the retaining plate, and the at least one spring opening of the hub flange are at least partially aligned when the clutch plate assembly is fully assembled thereby providing at least one damper pocket; and, at least one parametric spring which is positionable in each of the at least one damper pocket, and which is capable of providing torsion damper affects so as to reduce the torsional vibrations associated with the clutch engaging, wherein the at least one parametric spring is capable of controlling the amount of bending allowable under axial and centrifugal loading thereby improving the fatigue life of the at least one parametric spring.

It is another and/or alternative objective of the present invention to provide a method for increasing the torsional vibration dampening effects of a torque converter clutch system, the method comprising (1) providing a clutch plate assembly having at least one parametric spring, the at least one parametric spring further comprising an outer diameter which is variable along a longitudinal length of the at least one parametric spring and/or a coil-space transition which is variable along a longitudinal length of the at least one parametric spring, and the at least one parametric spring has a spring rate which is variable along a longitudinal length of the at least one parametric spring, (2) applying a torque to the clutch plate assembly, and/or (3) allowing the clutch plate assembly to sufficiently absorb the applied torque via the at least one parametric spring.

These and other objects and advantages will become apparent from the discussion of the distinction between the invention and the prior art and when determining the non-limiting embodiments of the invention as shown in the accompanying drawing figures.

BRIEF DESCRIPTION OF THE DRAWINGS

Reference may now be made to the drawings, which illustrate various embodiments that the invention may take in physical form and in certain parts and arrangements of parts wherein.

DETAILED DESCRIPTION OF A NON-LIMITING EMBODIMENT

Figure 1:
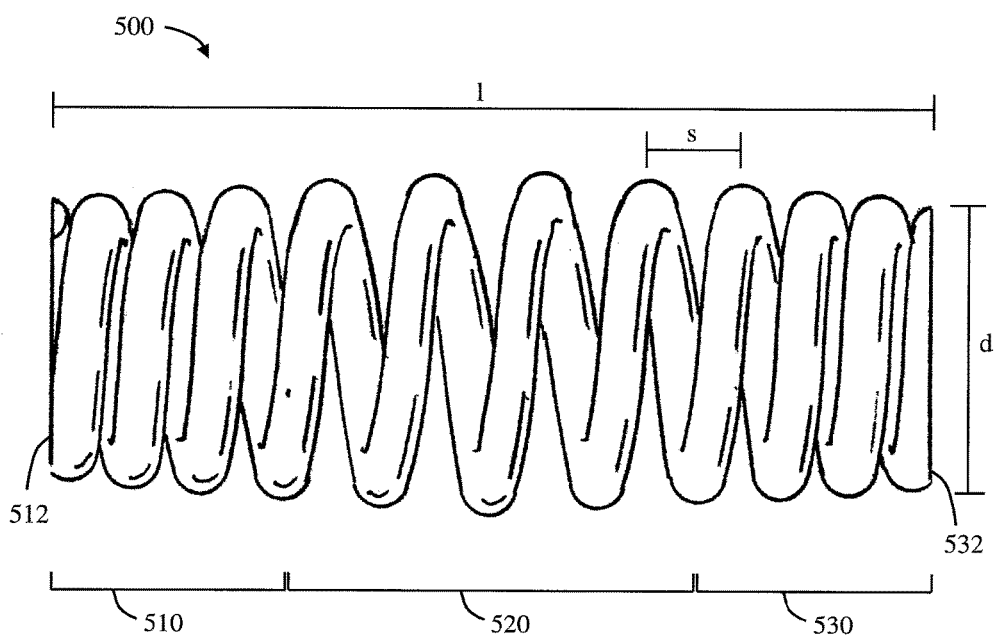
FIG. 1 is a perspective illustration of a parametric spring in accordance with one specific non-limiting aspect of the present invention.

Referring now to the drawings wherein the showing is for the purpose of illustrating non-limiting embodiments of the invention only and not for the purpose of limiting the same, FIGS. 1-4 illustrate a non-limiting embodiment of an improved clutch plate assembly incorporating a parametric spring in accordance with the present invention.

With reference now to FIG. 1, there is provided a perspective illustration of a parametric spring 500 in accordance with one non-limiting aspect of the present invention. The parametric spring 500 is illustrated as including a first spring portion 510, a second spring portion 520 and a third spring portion 530, wherein the second spring portion 520 is positioned between the first spring portion 510 and the third spring portion 530. First spring portion 510, second spring portion 520 and third spring portion 530 are illustrated as being formed in a one-piece construction; however, this is not required. The three spring portions can have the same or different longitudinal length. In one non-limiting configuration, the first and third spring portions have the same longitudinal length or have a longitudinal length that is within about 5% of one another. In another non-limiting configuration, the second spring portion has the same longitudinal length or has a longitudinal length that is within about 5% of the first and third spring portions. In another non-limiting configuration, the second spring portion has a greater longitudinal length that is at least 10% (e.g., 10%-200% greater and all values and ranges therebetween) of the first and third spring portions.

As further illustrated in FIG. 1, first spring portion 510 of parametric spring 500 has a mounting end 512, and a second end of the first spring portion 510 is continuous with a first end the second spring portion 520. Similarly, parametric spring 500 has a first end 512 and a second end 532. Typically, the first spring portion 510 has a first spring constant "$k_1$", the second spring portion 520 has a second spring constant "$k_2$", and the third spring portion 530 has a third spring constant "$k_3$". The first spring constant "$k_1$" is generally the same or nearly the same as the third spring constant "$k_3$", and both $k_1$ and $k_3$ are greater than the second spring constant "$k_2$"; however, this is not required. As such, the spring rate (i.e., compressibility) is variable along the longitudinal length "l" of the parametric spring 500. Generally, spring constants $k_1$ and $k_3$ are the same or are within about 5% of one another, and spring constants $k_1$ and $k_3$ are generally at least about 10% greater than spring constant $k_2$. In one non-limiting configuration, each of spring constants $k_1$ and $k_3$ are about 10%-200% (and all values and ranges therebetween) greater than spring constant $k_2$.

As illustrated in FIGS. 1-4, the outer diameter "d" of the parametric spring 500 is variable and/or non-constant along the longitudinal length "l" of the parametric spring 500. As illustrated in FIGS. 1-5, the outer diameter "d" of the parametric spring 500 increases from the first spring portion 510 to the second spring portion 520, and the outer diameter "d" of the parametric spring 500 decreases from the second spring portion 520 to the third spring portion 530. As such, the outer diameter "d" of the middle coils of the parametric spring 500 can be configured to control the amount of bending allowable in the middle coils of the parametric spring 500. The outer diameter of parametric spring 500 at the first and third spring portions can be uniform along the longitudinal length of such spring portions; however, this is not required. In one non-limiting arrangement, 60%-100% of the longitudinal length of the first and third spring portions (and all values and ranges therebetween) has a constant outer diameter. If the outer diameter of the first and third spring portions is different from the outer diameter of the other portion of the first and third spring portions, such different outer diameter generally occurs at or closely adjacent to the second spring portion. The outer diameter of the second spring portion can be constant or variable along the longitudinal length of the second spring portion. In one non-limiting configuration, 60%-100% of the longitudinal length of the second spring portion (and all values and ranges therebetween) has a constant outer diameter. When the second spring portion has a variable outer diameter, generally the largest outer diameter exist at or closely adjacent to the middle or mid region of the second spring portion as measured along the longitudinal length of the second spring portion. In one non-limiting configuration, the maximum outer diameter of the second spring portion is 10%-200% (and all values and ranges therebetween) greater than the maximum outer diameter of either the first and third spring portions.

As illustrated in FIG. 1, the coil-spacing "s" of the parametric spring 500 is variable and/or non-constant along the longitudinal length "l" of the parametric spring 500. The coil-spacing "s" of the parametric spring 500 increases from the first spring portion 510 to the second spring portion 520, and the coil-spacing "s" of the parametric spring 500 decreases from the second spring portion 520 to the third spring portion 530. As such, the coil-spacing "s" of the second spring portion can be configured to control the amount of bending allowable in the middle coils of the parametric spring. The coil-spacing of the first and third spring portions can be uniform along the longitudinal length of such spring portions; however, this is not required. In one non-limiting arrangement, 60%-100% of the longitudinal length of the first and third spring portions (and all values and ranges therebetween) has a constant coil-spacing. If the coil-spacing of the first and third spring portions is different from the coil-spacing of the other portion of the first and third spring portions, such different coil-spacing generally occurs at or closely adjacent to the second spring portion. The coil-spacing of the second spring portion can be constant or variable along the longitudinal length of the second spring portion. In one non-limiting configuration, 60%-100% of the longitudinal length of the second spring portion (and all values and ranges therebetween) has a constant coil-spacing. When the second spring portion has a variable coil-spacing, generally the largest coil-spacing exists at or closely adjacent to the middle or mid region of the second spring portion as measured along the longitudinal length of the second spring portion. In one non-limiting configuration, the maximum coil-spacing of the second spring portion is 10%-200% (and all values and ranges therebetween) greater than the maximum coil spacing of either the first and third spring portions.

Figure 2:
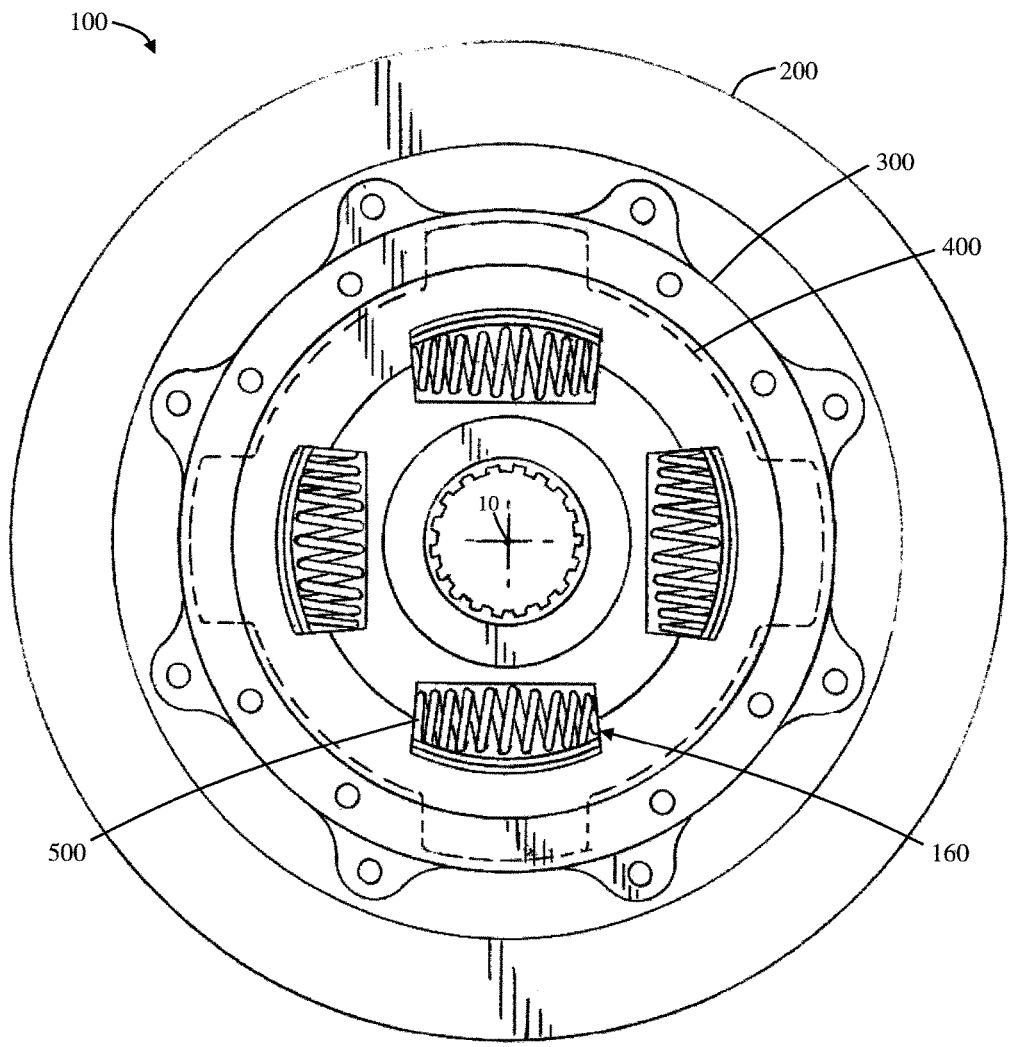
FIG. 2 is a front perspective illustration of a non-limiting clutch plate assembly incorporating the parametric spring of FIG. 1.
Figure 3:
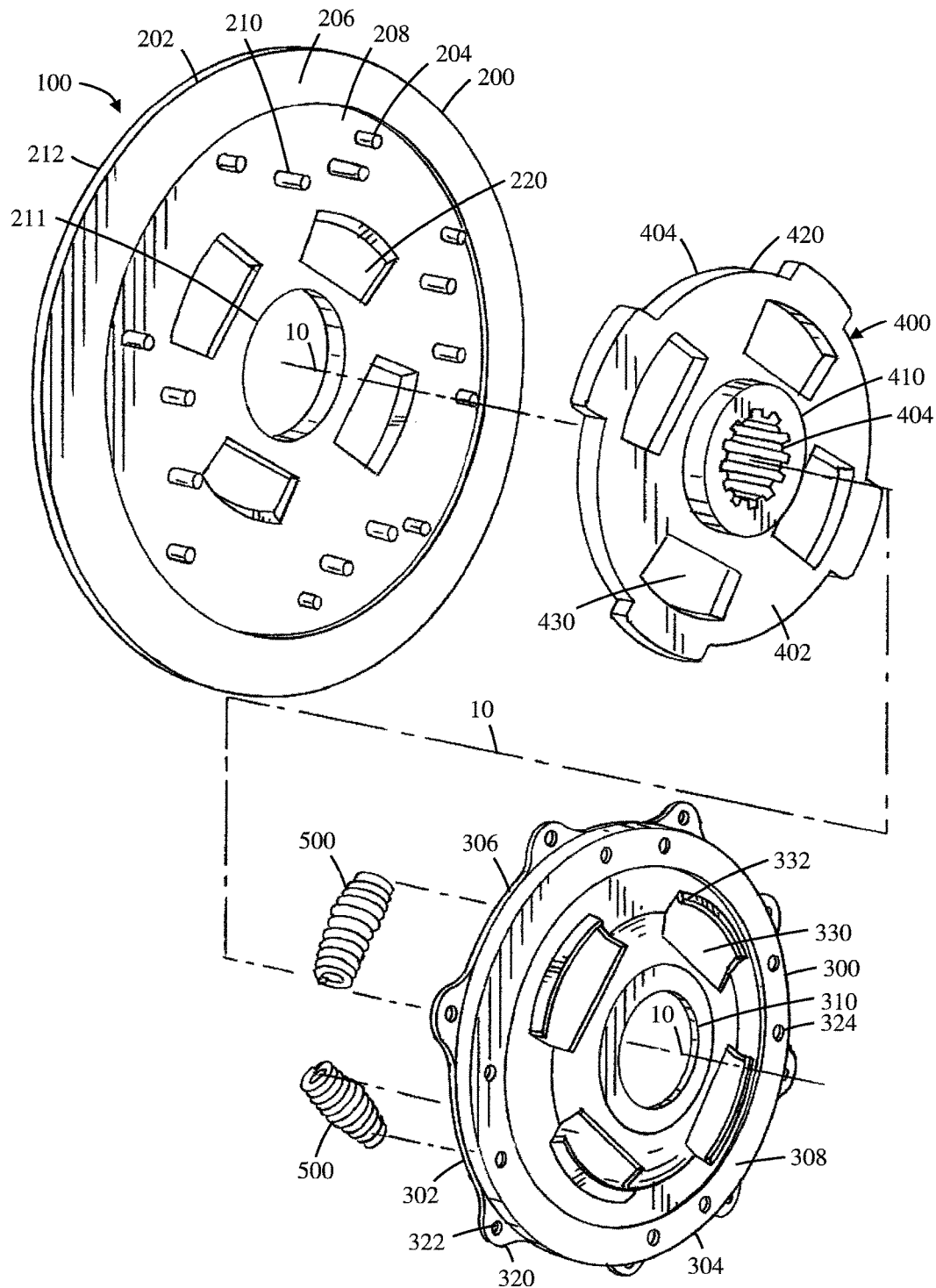
FIG. 3 is an exploded view, perspective illustration of the clutch plate assembly of FIG. 2.
Figure 4:
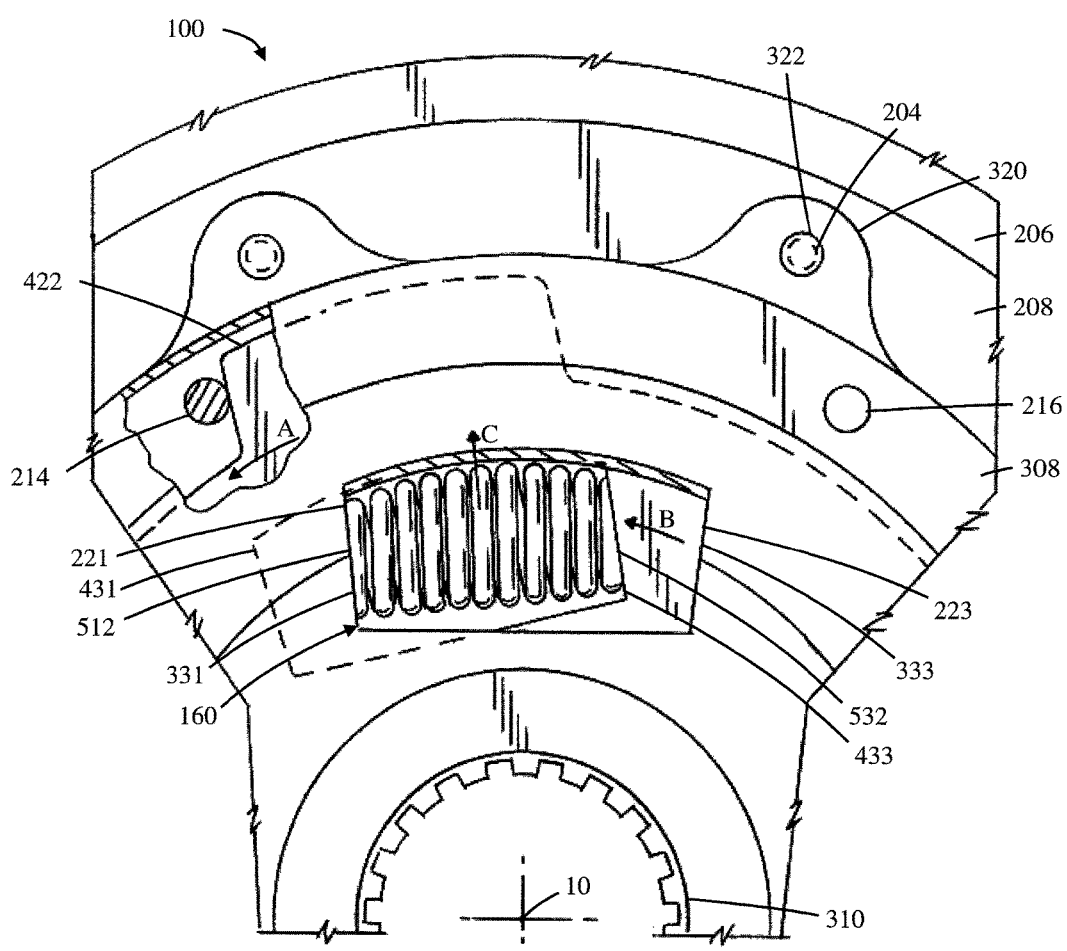
FIG. 4 is a front perspective enlarged illustration of a portion of the clutch plate assembly of FIG. 2 to which an axial force and a centrifugal force is applied.

With reference now to FIGS. 2-4 there is provided a clutch plate assembly 100 in accordance with one non-limiting aspect of the present invention. Clutch plate assembly 100 is illustrated as including a clutch plate 200, a retaining plate 300, a hub assembly 400 and at least one parametric spring 500. When using in a clutch/transmission system, the at least one parametric spring 500 is capable of providing a torsion dampening affect so as to isolate the transmission (not shown) from the aggressive movement of the clutch plate assembly 100; however, this is not required. As illustrated in FIGS. 2-4, the clutch plate 200, retaining plate 300, hub assembly 400 and parametric spring 500 are positioned about an axis 10.

Clutch plate 200 is illustrated as having a front surface 202 to which the retaining plate 300 can be mounted, and a rear surface 212 which is optionally engagable with another clutch component (not shown). The front surface 202 of clutch plate 200 is illustrated as including an outer, surface 206 (which can optionally be a faction surface) concentric with an inner, recessed surface 208 to which the retaining plate 300 is connected. Clutch plate 200 is also illustrated as including a center hole and/or aperture 211 of circular shape, and configured to facilitate insertion of a portion of the hub assembly 400 or a portion of an output shaft (not shown) therethrough.

With continued reference to FIGS. 2-4, clutch plate 200 is also illustrated as including a plurality of connection arrangements 204 provided on the recessed surface 208 of front surface 202. The plurality of connection arrangements 204 are illustrated as being spaced circumferentially about the front surface 202 of clutch plate 200. The connection arrangements 204 are configured to facilitate attachment of the retaining plate 300 thereto. The connection arrangements 204 are illustrated in FIGS. 2-4 as being protruding elements that extend from the recessed surface 208 of front surface 202 of clutch plate 200; however, this is not required. As can be appreciated, the connection arrangements 204 can be holes and/or apertures configured to receive fasteners (not shown) therethrough. Similarly, clutch plate 200 is illustrated as including a plurality of pins 210 provided in the recessed surface 208 of front surface 202. The plurality of pins 210 are illustrated as being spaced about the front surface 202 of clutch plate 200. The pins 210 are configured to 1) limit the movement of the hub assembly 400 relative to the clutch plate 200, and/or 2) facilitate the attachment of the retaining plate 300 thereto. Although the pins 210 are illustrated in FIGS. 2-4 as being protruding elements of cylindrical shape, it can be appreciated that any other shape can be used. In one non-limiting embodiment, the connection arrangements 204 can also or alternatively be used to limit the movement of the hub assembly 400 relative to the clutch plate; however, this is not required.

Clutch plate 200 also includes a plurality of spring openings 220 provided circumferentially about the clutch plate 200. The spring openings are illustrated as being positioned at or near a position about half the radius of the clutch plate 200; however, this is not required. As illustrated in FIGS. 2-4, spring openings 220 are provided on the recessed surface 208 of clutch plate 200. The spring openings are spaced form aperture 211. The spring openings 220 are provided for the purpose of at least partially releasably securing a parametric spring 500 therein. The outer coil diameter of a portion or all of the parametric spring 500 is greater than the thickness of the clutch plate that is used to form the spring opening. In the non-limiting clutch plate assembly embodiment of FIGS. 2-4, four spring openings 220 are provided on clutch plate 200 so as to accommodate the incorporation of four parametric springs 500 in the clutch plate assembly 100; however, it can be appreciated that more or less spring openings 220 can be used to accommodate more or less parametric springs. As can be appreciated, the spring opening can be substituted for cavity wherein all or a portion of the cavity does not pass fully through the clutch plate. The cavity, when used, facilitates in the positioning of the parametric spring on the clutch plate. Although not shown, spring openings can optionally include a retaining structure to inhibit or prevent the parametric spring from passing rewardly fully through the spring opening, and/or a back plate, not shown, that is connected to the rear of the clutch plate can be used to inhibit or prevent the parametric spring from passing rewardly fully through the spring opening.

Retaining plate 300 is illustrated has a rear surface 302 and a front surface 304. The rear surface 302 of retaining plate 300 is illustrated as being connected to clutch plate 200. Retaining plate 300 is also illustrated as including a center hole and/or aperture 310 of circular shape, and configured to facilitate insertion of a portion of hub assembly 400 or an input shaft (not shown) therethrough. The center hole and/or aperture 310 of retaining plate 300 is about the same in size and shape as the center hole and/or aperture 210 if clutch plate 200; however, this is not required.

Retaining plate 300 is also illustrated as including a plurality of flanges 320 extending outwardly from a peripheral edge 306 thereof. The flanges 320 are illustrated as being equally spaced circumferentially about the peripheral edge 306 of retaining plate 300; however, this is not required. The flanges 320 are also illustrated as including a hole and/or aperture 322 provided therethrough. The flanges 320 are configured to facilitate attachment of the retaining plate 300 to the clutch plate 200. The holes and/or apertures 322 are illustrated as to accommodate insertion of and/or connection with the connection arrangements 204 of clutch plate 200. In such a configuration, the rear surface 302 of retaining plate 300 can be mounted against the front surface 202 of clutch plate 200. Similarly, retaining plate 300 is illustrated as including a plurality of holes and/or apertures 324 through an outer, peripheral surface 308. The holes and/or apertures 324 are configured to accommodate insertion of and/or connection with the pins 210 of clutch plate 200. As such, the retaining plate 300 can be connected to the front surface 202 of clutch plate 200 by 1) attachment between connection arrangements 204 of clutch plate 200 and holes and/or apertures 322 of retaining plate 300, and/or 2) attachment between pins 210 of clutch plate 200 and holes and/or apertures 324 of retaining plate 300.

Retaining plate 300 also includes a plurality of spring openings 330 provided circumferentially about the retaining plate 300. The spring openings are illustrated as being positioned at or near a position about half the radius of the retaining plate 300; however, this is not required. The spring openings are spaced from aperture 310. The spring openings 330 are provided for the purpose of at least partially releasably securing a parametric spring 500 therein. The outer coil diameter of the parametric spring 500 is generally greater than the thickness of the spring opening in the retaining plate 300. As illustrated in FIGS. 2-4, the size and shape of the spring openings 330 of the retaining plate 300 are the same or similar to the spring openings 220 of the clutch plate 200. The positioning of the spring openings on the clutch plate and the retaining plate as such that when the retaining plate is connected to the clutch plate, the spring openings 330 of retaining plate 300 and spring openings 220 of clutch plate 200 align; however, this is not required. In the non-limiting clutch plate assembly embodiment of FIGS. 2-4, four openings 330 are provided on retaining plate 300 so as to accommodate the incorporation of the four parametric springs 500 in the clutch plate assembly 100. The front surface 304 of the retaining plate 300 is also illustrated as including one or more flanges 332 extending outwardly therefrom. The flanges 332 are configured to at least partially extending over the spring openings 330 of the retaining plate 300 so as to inhibit or prevent the parametric springs 500 from being displaced therefrom during use. Generally the positioning of flanges 332 is such that the bottom surface of the flanges is spaced from parametric spring when the parametric spring is not fully compressed. The positioning of flanges 332 can also be such that the bottom surface of the flanges is spaced from parametric spring when the parametric spring is fully compressed. The flanges are generally oriented at angle of about 20°-80° (and all values and ranges therebetween) relative to the front surface of the retaining plate, and typically about 30°-60° relative to the front surface of the retaining plate.

With continued reference to FIGS. 2-4, when the retaining plate 300 is connected to the front surface 202 of the clutch plate 200, there is provided a space and/or gap therebetween, wherein the space and/or gap is a sufficient distance so as to house at least a portion of the hub assembly 400.

Hub assembly 400 is illustrated as including a hub element 410 and a hub flange 420. The hub element 410 has a substantially hollow, cylindrical shape with approximately the same or similar diameter as 1) the center hole and/or aperture 310 of retaining plate 300, and/or 2) the center hole and/or aperture 210 of clutch plate 200. The hub flange 420 extends radially outward substantially perpendicularly (e.g., approximately 85°-95°) from an end of the hub element 410 so as to provide a substantially planar front surface 402 and rear surface 404.

The interior portion of the hub element 410 is illustrated as being splined 404; however, this is not required. As such, when the hub assembly 400 is caused to rotate, the splines 404 engage with a splined transmission input shaft (not shown) so as to cause rotation of the transmission input shaft and, ultimately, causing the vehicle to move. The hub element 410 is configured to be inserted through the center hole and/or aperture 310 of the retaining plate 300 such that the rear surface 302 of the retaining plate 300 is positioned at or near the front surface 402 of the hub flange 410. As such, when the retaining plate 300 is connected to the clutch plate 200, the hub assembly 400 "floats" and rotate in the space and/or gap formed therebetween. Although not shown, the back face of the hub assembly 400 can also or alternatively include a hub element that is configured to be inserted through aperture 211 of the clutch plate so as to enable hub assembly 400 "floats" and rotate in the space and/or gap formed between the clutch plate and the retaining plate.

The hub flange 420 includes a plurality of spring openings 430 provided circumferentially about the hub flange 420. The openings 430 are provided for the purpose of at least partially releasably securing a parametric spring 500 therein. The size and shape of the openings 430 of the hub flange 410 are configured to be about the same as 1) the spring openings 220 of the clutch plate 200, and/or 2) the spring openings 330 of the retaining plate 300. Furthermore, the plurality of spring openings 430 of hub assembly 400 are configured to at least partially align with 1) the spring openings 220 of the clutch plate 200, and/or 2) the spring openings 330 of the retaining plate 300, thereby providing a damper pocket 160.

As illustrated in FIGS. 2-4, at least 1) the spring openings 220 of the clutch plate 200, 2) the spring openings 420 of the hub assembly 400, and/or 3) the spring openings 330 of the retaining plate 300 can define a plurality of damper pockets 160 capable limiting the compression and/or relaxation of one or more parametric springs 500 provided therein. As such, the damper pockets 160 are capable of minimizing the risk of the parametric spring being released, deformed, and/or damaged during use.

As further illustrated in FIGS. 2-4, the width of the damper pockets 160 is variable along the length of the damper pocket 160 such that a middle portion of the damper pocket 160 has a width greater than the width of a first and/or second end portions of the damper pocket 160; however, this is not required. Generally, the width of the damper pocket 160 is configured to be greater than the width of the parametric spring 500 along the longitudinal length "l" of the parametric spring 500. In such a configuration, the parametric spring 500 can be adequately retained by the damper pocket 160 without causing excessive spring wear and/or damper pocket wear. In one non-limiting configuration, the bottom portion of the damper pocket is generally liner (i.e., non-curved) and the top portion of the damper pocket is curved as illustrated in FIG. 2. As illustrated in FIG. 2, the two sides of the damper pocket are also linear. As can be appreciated, both the top and bottom of the damper pocket can be linear or curved.

Referring now to FIG. 4, there is provided a perspective illustration of the clutch plate assembly 100 of the present invention where an axial and a centrifugal load are applied to a parametric spring 500 as the hub assembly moves counter-clockwise relative to the clutch plate and retaining plate.

Initially, in a resting position (i.e., when the clutch plate assembly 100 is not engaged), spring opening 220, spring opening 330, and spring opening 430 are at least partially aligned thereby providing damper pocket 160. Although not shown, in the resting position, front end 512 of the parametric spring 500 is seated and is at least partially in contact with 1) a first end 221 of spring opening 220 in the clutch plate 200, 2) a first end 331 of spring opening 330 in the retaining plate 300, and/or 3) a first end 431 of spring opening 430 in the hub flange 420. Similarly, in the resting position, the second end 532 of the parametric spring 500 is seated and is at least partially in contact with 1) a second end 223 of spring opening 220 in the clutch plate 200, 2) a second end 333 of spring opening 330 in the retaining plate 300, and/or 3) a second end 433 of spring opening 430 in the hub flange 420. As can be appreciated, when in the resting position, the first and/or second end of the parametric spring can be spaced from the ends of the spring openings of the clutch plate, the hub flange, and/or the retaining plate; however, this is not required.

As illustrated at least in FIG. 4, the hub flange 420 can include one or more tabs 422 extending outwardly therefrom. Tabs 422 can be used to limit the rotation of the hub assembly 400; however, this is not required. In a resting position (not shown), tab 422 can be positioned at or near pin 216; however, this is not required. As can be appreciated, tab 422 can be positioned at or near a midpoint, approximately equidistant from pin 214 and pin 216 in a resting position; however, this is not required. In such a configuration, counterclockwise movement of hub assembly 400 relative to the clutch plate 200 and retaining plate 300 can be limited by tab 422 engaging with pin 214. Similarly, clockwise movement of hub assembly 400 relative to the retaining plate 300 and clutch plate 200 can be limited by tab 422 engaging with pin 216.

When the clutch plate 200 and retaining plate 300 are held still while the hub assembly 400 is at least marginally rotated in the direction as indicated by arrow "A", an axial load is applied to the parametric spring 500 as illustrated by arrow "B". When the hub assembly 400 is caused to rotate in a counterclockwise direction as indicated by arrow "A", the tab 422 is also caused to move counterclockwise. As illustrated in FIG. 4, the parametric spring 500 is configured to compress gradually such that the second end 532 of the parametric spring 500 is at least partially seated on an end 433 of the spring opening 430 in the hub flange 420 while the first end 512 of the parametric spring 500 is at least partially seated on 1) an end 221 of the spring opening 220 in the clutch plate 200, and 2) an end 331 of the spring opening 330 in the retaining plate 300. As such, when the hub assembly 400 is caused to at least partially rotate relative to the clutch plate 200 and retaining plate 300, the applied torque is transmitted through axial compression (i.e., loading) of the parametric spring 500. Because the path of spring compression is arcuate, traditional straight, constant outer diameter compression spring systems often suffer from the disadvantage that spring is subjected to relatively high shear and principal stresses near the end regions of the spring when an axial load is applied. As such, the stress distribution along the longitudinal length of the straight, constant outer diameter compression spring is uneven. The end regions of straight, constant outer diameter compression springs are often responsible for absorbing the applied torque whereas the mid-region of the straight, constant outer diameter compression spring absorbs significantly less torque than the end regions. Thus, straight, constant outer diameter compression springs are inefficient at absorbing the applied torque.

With continued reference to FIG. 4, when the hub assembly 400 is caused to rotate further in the direction as indicated by arrow "A", a continued axial load is applied to the parametric spring 500 as illustrated by arrow "B", and a centrifugal load is now applied to the parametric spring 500 as illustrated by arrow "C". As illustrated in FIG. 4, the parametric spring 500 is configured to continue to compress gradually such that the second end 532 of the parametric spring 500 is at least partially seated on an end 433 of the spring opening 430 in the hub flange 420 while the first end 512 of the parametric spring 500 is at least partially seated on 1) an end 221 of the spring opening 220 in the clutch plate 200, and 2) an end 331 of the spring opening 330 in the retaining plate 300, until tab 422 comes into contact with pin 214. As such, after a pre-determined angle of rotation (and therefore a predetermined axial load applied to the parametric spring 500) has been reached, a centrifugal load as illustrated by arrow "C" is initiated thereby minimizing the stresses present at or near the ends of the parametric spring 500, and evenly distributing the applied torque across the longitudinal length "l" of the parametric spring 500. The applied torque can therefore be efficiently transmitted through axial and centrifugal compression (i.e. loading) of the parametric spring 500.

Figure 5:
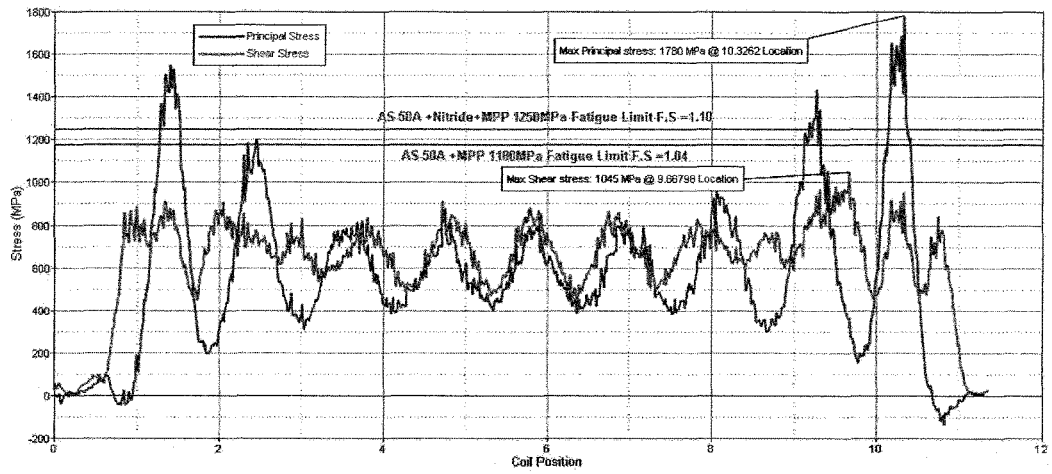
FIG. 5 is a graphical diagram illustrating shear and principal stresses of an existing straight, compression spring used in a standard clutch plate assembly; and, FIG. 6 is a graphical diagram illustrating shear and principal stresses of the parametric spring used in the standard clutch plate assembly.
Figure 6:
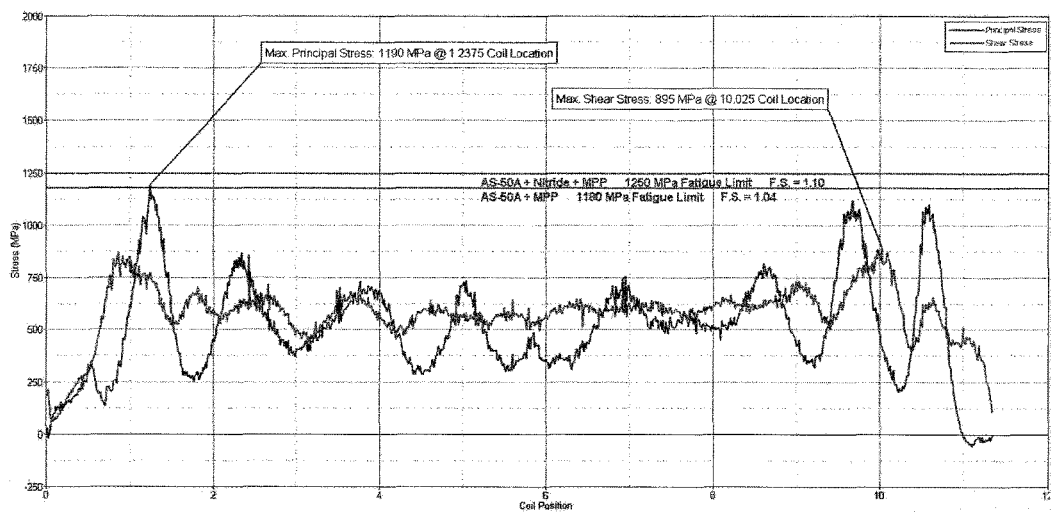

With reference now to FIGS. 5-6, there is provided a graphical comparison illustrating stress versus coil location profile of the presently disclosed parametric spring 500 and a straight, constant outer diameter compression spring in a clutch plate assembly as illustrated in FIGS. 1-4. The compared springs had the same longitudinal length, were formed of the same material, used the same wire to form the springs, and had the same number of coils. The parametric spring had a variable outer diameter, which outer diameter was greatest in the mid-region of the parametric spring. The parametric spring had variable coil-spacing wherein the coil-spacing was greater in the mid-region of the parametric spring than at the two end regions of the parametric spring. The straight, constant outer diameter compression spring had constant coil-spacing except at the two ends.

As illustrated in FIG. 5, when an axial load and a centrifugal load are applied to a straight, constant outer diameter compression spring, the principal stress of the straight, constant outer diameter compression spring is relatively high. Generally, the maximum principal stress of the straight, constant outer diameter compression spring is from about 1600 MPa to about 2000 MPa, and more specifically about 1780 MPa.

Similarly, when an axial load and a centrifugal load are applied to a straight, constant outer diameter compression spring, the shear stress of the straight compression, constant outer diameter spring is relatively high. As illustrated in FIG. 6, the maximum shear stress of the straight, constant outer diameter compression spring is from about 1000 MPa to about 1400 MPa, and more specifically about 1045 MPa.

As further illustrated in FIG. 5, the maximum principal stress of the straight, constant outer diameter compression spring is present at or near one end of the straight compression spring, particularly at or near the last ⅓ of the straight, constant outer diameter compression spring, and even more specifically at about the 10.3263 location of the straight compression, constant outer diameter spring. With further reference to the graph of FIG. 5, it can be seen that the principal stress of the straight, constant outer diameter compression spring is also relatively high at the second end of the straight, constant outer diameter compression spring, particularly at the first ⅓ of the straight compression, constant outer diameter spring, while the principal stress of the middle ⅓ of the straight compression, constant outer diameter spring is significantly lower.

Similarly, the maximum shear stress of the straight, constant outer diameter compression spring is present at or near one end of the straight, constant outer diameter compression spring, particularly at or near the last ⅓ of the straight, constant outer diameter compression spring, and even more specifically at about the 9.66798 location of the straight, constant outer diameter compression spring. With further reference to the graph of FIG. 5, it can be seen that the shear stress of the straight, constant outer diameter compression spring fluctuates between about 500 MPa and about 1000 MPa along the middle coils of the straight, constant outer diameter compression spring.

With reference now to FIG. 6, when an axial load and a centrifugal load are applied to the parametric spring, the principal stress of the parametric spring is significantly lower than the principal stress of the straight, constant outer diameter compression spring. This result was unexpected. Generally, the maximum principal stress of the parametric spring is from about 800 MPa to about 1200 MPa, and more specifically about 1190 MPa.

Similarly, when an axial load and a centrifugal load are applied to the parametric spring of the present invention, the shear stress of the parametric spring is significantly reduced as compared to the straight, constant outer diameter compression spring. This result was also unexpected. As illustrated in FIG. 6, the maximum shear stress of the parametric spring is from about 600 MPa to about 900 MPa, and more specifically about 895 MPa.

As further illustrated in FIG. 6, the maximum principal stress of the parametric spring is present at or near one end of the parametric spring, particularly at or near the first ⅓ of the parametric spring, and even more specifically at about the 1.2375 coil location of the parametric spring. With further reference to the graph of FIG. 6, it can be seen that the principal stress of the parametric spring is highest at the second end of the parametric spring, particularly at the last ⅓ of the parametric spring, and more specifically at about the 10.025 coil location of the parametric spring. As can be seen in the graphs of FIGS. 5-6, while the maximum shear stress of the parametric spring is present at about the last ⅓ of the parametric spring, the shear stress along the longitudinal length of the parametric spring of the present invention is substantially constant, especially when compared to the shear stress along the longitudinal length of the straight, constant outer diameter compression spring.

As such, the average shear stress, the maximum shear stress, the average principal stress, and the maximum principal stress of the parametric spring 500 are significantly less than the straight, constant outer diameter compression spring when used in a clutch plate assembly application. Generally, the maximum principal stress of the parametric spring 500 is about 5% to about 90% less than a straight, constant outer diameter compression spring (and all ranges or values therebetween), typically about 10% to about 60% less than a straight, constant outer diameter compression spring, and more typically about 12% to about 40% less than a straight, constant outer diameter compression spring. Generally, the average principal stress of the parametric spring 500 is about 5% to about 50% less than a straight, constant outer diameter compression spring (and all ranges or values therebetween), typically about 7% to about 40% less than a straight, constant outer diameter compression spring, and more typically about 8% to about 30% less than a straight, constant outer diameter compression spring. Generally, the maximum shear stress of the parametric spring 500 is about 2% to about 80% (and all ranges or values therebetween) less than a straight, constant outer diameter compression spring, typically about 5% to about 50% less than a straight, constant outer diameter compression spring, and more typically from about 12% to about 40% less than a straight, constant outer diameter compression spring. Generally, the average shear stress of the parametric spring 500 is about 2% to about 80% (and all ranges or values therebetween) less than a straight, constant outer diameter compression spring, typically about 4% to about 40% less than a straight, constant outer diameter compression spring, and more typically from about 5% to about 30% less than a straight, constant outer diameter compression spring.

This novel application of the parametric spring 500 in a clutch plate assembly application is responsible for dissipating these stresses approximately equally across the longitudinal length "l" of the parametric spring 500, thereby substantially lowering the effect of high applied stress, and increasing the overall fatigue life of the parametric spring 500.

As such, the maximum stresses applied to the parametric spring 500 are significantly less than the same maximum stresses when applied to a straight, constant outer diameter compression spring, specifically in the areas of known high-stress due to axial and/or centrifugal loading. Furthermore, the stress distribution of the parametric spring 500 along the longitudinal length "l" of the parametric spring 500 is more constant than the stress distribution of the straight, constant outer diameter compression spring. The significant reduction of stresses to the parametric spring 500, in combination with a more uniform stress distribution, results in an increased fatigue life of the parametric spring 500 as compared to straight, constant outer diameter compression springs. Similarly, sufficient absorption of the stresses and/or torsional vibrations applied to the clutch system by the clutch plate assembly 100 results in an increased fatigue life of the clutch plate assembly, and, therefore, the torque converter clutch system.

While considerable emphasis has been placed herein on the structures and configurations of the preferred embodiments of the invention, it will be appreciated that other embodiments, as well as modifications of the embodiments disclosed herein, can be made without departing from the principles of the invention. These and other modifications of the preferred embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

What is claimed:

1. A clutch plate assembly comprising:
    a clutch plate having a front and rear surface, said clutch plate including a first spring opening, said front surface including an outer surface concentric with an inner recessed surface, said first spring opening being provided through said inner recessed surface;
    a retaining plate having a front and rear surface, said rear surface configured to be mounted against said front surface of said clutch plate, said retaining plate forming a hub space between said retaining plate and said clutch plate when said retaining plate is connected to said clutch plate, said retaining plate including a first spring opening;
    a hub assembly, said hub assembly including a hub element and a hub flange, said hub flange positioned in said hub space when said retaining plate is connected to said clutch plate, said hub flange including a first spring opening; and,
    a first parametric spring, said first parametric spring having one or more features selected from the group consisting of i) an outer diameter which is variable along a longitudinal length of said first parametric spring, ii) a coil-spacing which is variable along said longitudinal length of said first parametric spring; and iii) a spring rate which is variable along said longitudinal length of said first parametric spring;
    wherein said first spring opening of said clutch plate, said first spring opening of said retaining plate, and said first spring opening of said hub flange are at least partially aligned with one another when said retaining plate is connected to said clutch plate and said hub flange is positioned in said hub space to thereby provide a first damper pocket; and,
    wherein said first parametric spring is positioned in said first damper pocket.

2. The clutch plate assembly as defined in claim 1, wherein said first parametric spring further comprises:
    a first spring portion having a first end, said first spring portion having a first spring constant;
    a second spring portion having a second spring constant; and,
    a third spring portion having a second end, said third spring portion having a third spring constant, wherein said second spring portion is positioned between said first spring portion and said third spring portion, wherein i) said first spring constant and said second spring constant are different, ii) said third spring constant and said second spring constant are different, or iii) both i) and ii).

3. The clutch plate assembly as defined in claim 1, wherein said outer diameter of said first parametric spring is variable along said longitudinal length of said first parametric spring, said outer diameter of a middle portion of said first parametric spring is greater than said outer diameter at each of said ends of said first parametric spring.

4. The clutch plate assembly as defined in claim 2, wherein said outer diameter of said first parametric spring is variable along said longitudinal length of said first parametric spring, said outer diameter of a middle portion of said first parametric spring is greater than said outer diameter at each of said ends of said first parametric spring.

5. The clutch plate assembly as defined in claim 1, wherein said coil-spacing of said first parametric spring is variable along said longitudinal length of said first parametric spring, said coil-spacing of a middle portion of said first parametric spring is greater than said coil-spacing at each of said ends of said first parametric spring.

6. The clutch plate assembly as defined in claim 4, wherein said coil-spacing of said first parametric spring is variable along said longitudinal length of said first parametric spring, said coil-spacing of a middle portion of said first parametric spring is greater than said coil-spacing at each of said ends of said first parametric spring.

7. The clutch plate assembly as defined in claim 1, wherein said spring rate of said first parametric spring is variable along said longitudinal length of said first parametric spring, said spring-rate of a middle portion of said first parametric spring is less than said spring rate at each of said ends of said first parametric spring.

8. The clutch plate assembly as defined in claim 6, wherein said spring rate of said first parametric spring is variable along said longitudinal length of said first parametric spring, said spring-rate of a middle portion of said first parametric spring is less than said spring rate at each of said ends of said first parametric spring.

9. The clutch plate assembly as defined in claim 1, wherein a width of said first damper pocket is variable along a longitudinal length of said first damper pocket.

10. The clutch plate assembly as defined in claim 8, wherein a width of said first damper pocket is variable along a longitudinal length of said first damper pocket.

11. The clutch plate assembly as defined in claim 1, wherein a top portion of said first damper pocket is arcuate shaped.

12. The clutch plate assembly as defined in claim 10, wherein a top portion of said first damper pocket is arcuate shaped.

13. The clutch plate assembly as defined in claim 1, wherein said clutch plate assembly further includes second and third damper pockets, said second damper pocket includes a second parametric spring, said third damper pocket includes a third parametric spring.

14. The clutch plate assembly as defined in claim 12, wherein said clutch plate assembly further includes second and third damper pockets, said second damper pocket includes a second parametric spring, said third damper pocket includes a third parametric spring.

15. A clutch plate assembly comprising:
a clutch plate having a front and rear surface, said clutch plate including a first and second spring openings, said front surface including an outer surface concentric with an inner recessed surface, said first and second spring openings being provided through said inner recessed surface;
a retaining plate having a front and rear surface, said rear surface configured to be mounted against said front surface of said clutch plate, said retaining plate forming a hub space between said retaining plate and said clutch plate when said retaining plate is connected to said clutch plate, said retaining plate including a first and second spring openings;
a hub assembly, said hub assembly including a hub element and a hub flange, said hub flange positioned in said hub space when said retaining plate is connected to said clutch plate, said hub flange including a first and second spring openings; and,
first and second parametric springs, said first and second parametric spring having two or more features selected from the group consisting of i) an outer diameter which is variable along a longitudinal length of said parametric spring, ii) a coil-spacing which is variable along said longitudinal length of said parametric spring; and iii) a spring rate which is variable along said longitudinal length of said parametric spring;
wherein said first spring opening of said clutch plate, said first spring opening of said retaining plate, and said first spring opening of said hub flange are at least partially aligned with one another when said retaining plate is connected to said clutch plate and said hub flange is positioned in said hub space to thereby provide a first damper pocket;
wherein said second spring opening of said clutch plate, said second spring opening of said retaining plate, and said second spring opening of said hub flange are at least partially aligned with one another when said retaining plate is connected to said clutch plate and said hub flange is positioned in said hub gap to thereby provide a second damper pocket and,
wherein said first parametric spring is positioned in said first damper pocket, said second parametric spring is positioned in said second damper pocket;
wherein said first and second parametric springs are capable of providing torsion damper affects so as to reduce torsional vibrations associated with operation of said clutch plate assembly;
wherein said first and second parametric springs are capable of controlling the amount of bending allowable under axial and centrifugal loading thereby improving fatigue life of said first and second parametric springs.

16. The clutch plate assembly as defined in claim 15, wherein each of said first and second parametric springs include:
a first spring portion having a first spring constant, a second spring portion having a second spring constant, a third spring portion having a third spring constant, said second spring portion is positioned between said first spring portion and said third spring portion, said first spring constant and said second spring constant are different, and said third spring constant and said second spring constant are different;
said outer diameter is variable along said longitudinal length of said first and second parametric springs, said outer diameter of a middle portion of said first and second parametric springs is greater than said outer diameter at each of said ends of said first and second parametric springs;

said coil-spacing of said first and second parametric springs is variable along said longitudinal length of said first and second parametric springs, said coil-spacing of a middle portion of said first and second parametric springs is greater than said coil-spacing at each of said ends of said first and second parametric springs;

said spring rate of said first and second parametric springs is variable along said longitudinal length of said first and second parametric springs, said spring-rate of a middle portion of said first and second parametric springs is less than said spring rate at each of said ends of said first and second parametric spring.

17. The clutch plate assembly as defined in claim 15, wherein a width of said first and second damper pockets is variable along a longitudinal length of said first and second damper pockets, a top portion of said first and second damper pockets is arcuate shaped, a base of said first and second damper pockets is liner-shaped.

18. The clutch plate assembly as defined in claim 16, wherein a width of said first and second damper pockets is variable along a longitudinal length of said first and second damper pockets, a top portion of said first and second damper pockets is arcuate shaped, a base of said first and second damper pockets is liner-shaped.

19. The clutch plate assembly as defined in claim 15, wherein said clutch plate assembly further includes third and fourth damper pockets, said third damper pocket includes a third parametric spring, said fourth damper pocket includes a fourth parametric spring, said first, second, third and fourth parametric springs are the same.

20. The clutch plate assembly as defined in claim 18, wherein said clutch plate assembly further includes third and fourth damper pockets, said third damper pocket includes a third parametric spring, said fourth damper pocket includes a fourth parametric spring, said first, second, third and fourth parametric springs are the same.

21. A method for increasing the torsional vibration dampening effects of a torque converter clutch system, the method comprising:
providing a clutch plate assembly, said clutch plate assembly comprising:
a clutch plate having a front and rear surface, said clutch plate including a first spring opening, said front surface including an outer surface concentric with an inner recessed surface, said first spring opening being provided through said inner recessed surface;
a retaining plate having a front and rear surface, said rear surface configured to be mounted against said front surface of said clutch plate, said retaining plate forming a hub space between said retaining plate and said clutch plate when said retaining plate is connected to said clutch plate, said retaining plate including a first spring opening;
a hub assembly, said hub assembly including a hub element and a hub flange, said hub flange positioned in said hub space when said retaining plate is connected to said clutch plate, said hub flange including a first spring opening; and,
a first parametric spring, said first parametric spring having one or more features selected from the group consisting of i) an outer diameter which is variable along a longitudinal length of said first parametric spring, ii) a coil-spacing which is variable along said longitudinal length of said first parametric spring; and iii) a spring rate which is variable along said longitudinal length of said first parametric spring;

wherein said first spring opening of said clutch plate, said first spring opening of said retaining plate, and said first spring opening of said hub flange are at least partially aligned with one another when said retaining plate is connected to said clutch plate and said hub flange is positioned in said hub space to thereby provide a first damper pocket; and,
wherein said first parametric spring is positioned in said first damper pocket;
applying a torque to said clutch plate assembly to cause said first parametric spring to move between a compressed and uncompressed positioned, and thereby enabling said clutch plate assembly to sufficiently absorb said applied torque via said first parametric spring.

22. The method as defined in claim 21, wherein one or more of an average shear stress, a maximum shear stress, an average principal stress, and a maximum principal stress of said first parametric spring when used in said clutch plate assembly are significantly less than a comparable straight, constant outer diameter compression spring when used in said clutch plate assembly.

23. A clutch plate assembly comprising:
a clutch plate having a front and rear surface, said clutch plate including a first and second spring openings, said front surface including an outer surface concentric with an inner recessed surface, said first and second spring openings being provided through said inner recessed surface;
a retaining plate having a front and rear surface, said rear surface configured to be mounted against said front surface of said clutch plate, said retaining plate forming a hub space between said retaining plate and said clutch plate when said retaining plate is connected to said clutch plate, said retaining plate including a first and second spring openings;
a hub assembly, said hub assembly including a hub element and a hub flange, said hub flange positioned in said hub space when said retaining plate is connected to said clutch plate, said hub flange including a first and second spring openings; and,
first and second parametric springs, said first and second parametric spring having two or more features selected from the group consisting of i) an outer diameter which is variable along a longitudinal length of said parametric spring, ii) a coil-spacing which is variable along said longitudinal length of said parametric spring, and iii) a spring rate which is variable along said longitudinal length of said parametric spring; each of said first and second parametric springs include a first spring portion having a first spring constant, a second spring portion having a second spring constant, a third spring portion having a third spring constant, said second spring portion is positioned between said first spring portion and said third spring portion, said first spring constant and said second spring constant are different, and said third spring constant and said second spring constant are different, said outer diameter is variable along said longitudinal length of said first and second parametric springs, said outer diameter of a middle portion of said first and second parametric springs is greater than said outer diameter at each of said ends of said first and second parametric springs, said coil-spacing of said first and second parametric springs is variable along said longitudinal length of said first and second parametric springs, said coil-spacing of a middle portion of said first and second parametric springs is greater than said coil-spacing at each of said ends of said first and second parametric springs, said spring rate of said first and second parametric springs is variable along said longitudinal length of said first and second parametric springs, said spring-rate of a middle portion of said first and second parametric springs is less than said spring rate at each of said ends of said first and second parametric spring;

wherein said first spring opening of said clutch plate, said first spring opening of said retaining plate, and said first spring opening of said hub flange are at least partially aligned with one another when said retaining plate is connected to said clutch plate and said hub flange is positioned in said hub space to thereby provide a first damper pocket, a width of said first damper pocket is variable along a longitudinal length of said first pocket, a top portion of said first damper pocket is arcuate shaped, a base of said first damper pocket is liner-shaped;

wherein said second spring opening of said clutch plate, said second spring opening of said retaining plate, and said second spring opening of said hub flange are at least partially aligned with one another when said retaining plate is connected to said clutch plate and said hub flange is positioned in said hub space to thereby provide a second damper pocket, a width of said second damper pocket is variable along a longitudinal length of said second damper pocket, a top portion of said second damper pocket is arcuate shaped, a base of said second damper pocket is liner shaped and, wherein said first parametric spring is positioned in said first damper pocket, said first parametric spring is the only spring positioned in said first damper pocket, said second parametric spring is positioned in said second damper pocket, said second parametric spring is the only spring positioned in said second damper pocket;

wherein said first and second parametric springs are capable of providing torsion damper affects so as to reduce torsional vibrations associated with operation of said clutch plate assembly;

wherein said first and second parametric springs are capable of controlling the amount of bending allowable under axial and centrifugal loading thereby improving fatigue life of said first and second parametric springs.

\* \* \* \* \*